(12) United States Patent
Brombach (10) Patent No.: US 11,067,059 B2
(45) Date of Patent: Jul. 20, 2021

(54) WIND TURBINE OR WIND PARK FOR SUPPLYING ELECTRIC POWER

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/621,590

(22) PCT Filed: Jun. 7, 2018

(86) PCT No.: PCT/EP2018/064959
§ 371 (c)(1),
(2) Date: Dec. 11, 2019

(87) PCT Pub. No.: WO2018/228901
PCT Pub. Date: Dec. 20, 2018

(65) Prior Publication Data
US 2020/0116127 A1 Apr. 16, 2020

(30) Foreign Application Priority Data

Jun. 13, 2017 (DE) ...................... 10 2017 112 944.8

(51) Int. Cl.
*F03D 7/02* (2006.01)
*F03D 7/04* (2006.01)
*H02J 3/10* (2006.01)

(52) U.S. Cl.
CPC .......... *F03D 7/0284* (2013.01); *F03D 7/048* (2013.01); *H02J 3/10* (2013.01); *F05B 2270/337* (2013.01)

(58) Field of Classification Search
CPC .......... F03D 7/0284; F03D 7/048; F03D 7/02; F03D 7/04; H02J 3/10; F05B 2270/337
See application file for complete search history.

(56) References Cited

U.S. PATENT DOCUMENTS

| 6,891,281 | B2 | 5/2005 | Wobben |
| 6,965,174 | B2 | 11/2005 | Wobben |
| 8,664,788 | B1 | 3/2014 | Wagoner et al. |
| 9,279,411 | B2 | 3/2016 | Beekmann et al. |

(Continued)

FOREIGN PATENT DOCUMENTS

| DE | 102013207264 A1 | 10/2014 |
| DE | 102014214151 A1 | 1/2016 |

(Continued)

*Primary Examiner* — Robert L Deberadinis
(74) *Attorney, Agent, or Firm* — Seed IP Law Group LLP (57) ABSTRACT

Provided is a method for supplying electric power to an electric supply network at a network connection point using a converter-controlled supply apparatus. The converter-controlled supply apparatus may be a wind farm or a wind turbine. A selection is permitted at least between a current-impressing operating mode and a voltage-impressing operating mode for the purpose of supplying the electric power. Open-loop or closed-loop control to a desired current value is substantially or predominantly performed in the current-impressing operating mode, and open-loop or closed-loop control to a desired voltage value is substantially or predominantly performed in the voltage-impressing operating mode.

20 Claims, 6 Drawing Sheets

(56) References Cited

U.S. PATENT DOCUMENTS

| | | | |
|---|---|---|---|
| 10,050,445 B2 * | 8/2018 | Pahlevaninezhad | .... H02J 3/385 |
| 10,161,385 B2 | 12/2018 | Busker et al. | |
| 2001/0048290 A1 | 12/2001 | Underwood et al. | |
| 2013/0215652 A1 | 8/2013 | Komatsu et al. | |
| 2015/0198145 A1 | 7/2015 | Diedrichs et al. | |
| 2017/0018929 A1 | 1/2017 | Majumder | |
| 2017/0018932 A1 | 1/2017 | Pahlevaninezhad et al. | |
| 2017/0163040 A1 | 6/2017 | Bamberger et al. | |

FOREIGN PATENT DOCUMENTS

| | | |
|---|---|---|
| EP | 2182626 A1 | 5/2010 |
| EP | 1946436 B1 | 6/2012 |
| JP | 2005020870 A | 1/2005 |
| JP | 2011067014 A | 3/2011 |
| JP | 2017011929 A | 1/2017 |
| RU | 2408971 C2 | 1/2011 |
| RU | 2605083 C2 | 12/2016 |

\* cited by examiner

WIND TURBINE OR WIND PARK FOR SUPPLYING ELECTRIC POWER

BACKGROUND

Technical Field

The present invention relates to a method for supplying electric power to an electric supply network by means of a converter-controlled supply apparatus, in particular by means of a wind farm or a wind turbine. The present invention also relates to a corresponding wind farm and relates to a corresponding wind turbine.

Description of the Related Art

The practice of supplying electric power by means of a wind farm or at least by means of an individual wind turbine is known. Modern wind turbines and wind farms use converter units for this purpose in order to suitably condition the electric power generated from the wind for supply, in particular to adapt it to the respective supply situation in terms of frequency, phase and amplitude.

In this case, it is also known practice to support the electric supply network by means of wind turbines or wind farms, which can also be referred to as network support in a simplified manner.

For such network support, the supply of power, in particular, is adapted to the specific network situation. This includes increasing or reducing the power which is supplied depending on the network situation or the network requirement. The practice of supplying a reactive power on the basis of a network situation or a network requirement also comes into consideration. In this case, a network requirement is, in particular, a requirement which is directed from an operator of the electric supply network, that is to say the network operator, to the wind turbine or the wind farm.

Firm open-loop control rules are often stored in the wind turbine or the wind farm for such network support. Such open-loop control rules may comprise, for example, closed-loop power control which is dependent on the network frequency, as described, for example, in the U.S. Pat. No. 6,891,281. Voltage-dependent closed-loop phase angle control, which indicates a relationship between the phase angle describing the phase difference between the current and the voltage and an electric voltage of the electric supply network or a voltage determined by the electric supply network comes into consideration as a further example. Such voltage-dependent closed-loop phase angle control is described in the U.S. Pat. No. 6,965,174. It also comes into consideration that, in the event of a fast frequency drop, a power increase in the sense of an instantaneous reserve is accordingly provided in the short term and briefly, wherein this power increase can be taken from the flywheel mass of the rotating rotor of the wind turbine. Such a variant can be gathered, for example, from the U.S. Pat. No. 9,279,411.

Many of these support measures, in particular the frequency-dependent power changes, are based on an electric supply network of a particular, currently conventional type. It is generally taken as a basis, in particular, that the electric supply network is controlled by large power stations which use large synchronous generators directly coupled to the electric supply network. For example, a frequency-dependent power change which specifically takes into account a behavior of such a directly coupled synchronous generator traces back to this. In the case of such a behavior, such a synchronous generator accelerates if it cannot deliver the power, with which it is rotated mechanically, for example by a steam turbine, to the electric supply network. Since said generator is electrically directly coupled to the electric supply network, this speed increase then results in an increase in the supplied frequency and this is substantially the reason why an increased frequency in the electric supply network can indicate a power oversupply in the electric supply network.

Voltage effects in the electric supply network also often trace back to the behavior of such a directly coupled large synchronous generator. On the one hand, these synchronous generators substantially conduct the voltage in the electric supply network, in which case location-dependent variations are additionally substantially caused by transformers and transmission lines. On the other hand, however, effects such as phase jumps can likewise be traced back to the behavior of synchronous generators.

If the structure of the electric supply network now changes, this may result in the network support measures provided no longer being suited or no longer being so well suited to network support.

The behavior of the electric supply network is also influenced, inter alia, by the manner in which producers and consumers are distributed in the electric supply network. Sections which are decentralized and to which many wind turbines or wind farms are connected behave differently, for example, to network sections which have many consumers in the vicinity of a large power station.

The German Patent and Trademark Office carried out a search in respect of the following prior art in the priority application for the present application: EP 2 182 626A1; DE 10 2014 214 151 A1; DE 10 2013 207 264 A1; U.S. Pat. No. 6,891,281 B2; U.S. Pat. No. 6,965,174 B2 and U.S. Pat. No. 9,279,411 B2.

BRIEF SUMMARY

Improving network support by converter-controlled supply apparatuses, in particular wind farms and therefore wind turbines, is provided herein. Improving the supply by such converter-controlled supply apparatuses with regard to network support or network stabilization, that is to say for making the supply more network-compatible, is also provided herein.

A supply method is provided. Accordingly, electric power is supplied to an electric supply network by means of a converter-controlled supply apparatus. Wind farms or wind turbines, in particular, are proposed here as a converter-controlled supply apparatus. A converter-controlled supply apparatus is an apparatus which generates the supplied current or the supplied voltage by means of a converter or an inverter, namely according to frequency, phase angle and amplitude. A harmonic component, for example, can also be set thereby.

In this respect, it is proposed that it is possible to choose at least between a current-impressing operating mode and a voltage-impressing operating mode for the purpose of supplying the electric power. In this case, open-loop or closed-loop control to a desired current value is carried out in the current-impressing operating mode, and open-loop or closed-loop control to a desired voltage value is carried out in the voltage-impressing operating mode. These two operating modes fundamentally differ in this respect. The current-impressing operating mode is implemented, in particular, in such a manner that a desired current to be supplied is specified according to the frequency, phase angle and amplitude. However, this specification may be dynamic and may change continuously during ongoing operation. In particular, the specification of a corresponding desired current value can be continuously adapted to the available power. In the case of a wind turbine in particular, this means that this desired current can continuously adapt to the available wind power, that is to say to the power which can be taken from the wind by the wind turbine at the respective moment.

In particular, such a converter-controlled supply apparatus may have a plurality of supply units, namely, in particular, a plurality of converters or inverters. A plurality of such units may be present even in a wind turbine. Such a supply unit may often be respectively present in a switchgear cabinet.

In this case, the voltage-impressing operating mode or the current-impressing operating mode may mean that each supply unit, that is to say each converter or inverter or each switchgear cabinet, is operated in the corresponding operating mode. This may therefore mean that each affected switchgear cabinet supplies power in a voltage-impressing manner or in a current-impressing manner.

However, one embodiment preferably proposes that a mixed mode, in which only some supply units have the prevailing operating mode, also comes into consideration. If voltage-impressing supply units dominate, reference can also be made to a voltage-impressing mode and, if current-impressing units dominate, reference can be made to a current-impressing mode.

If electric power is supplied in the current-impressing operating mode in such a manner that a supply current is respectively specified for this, this may mean, in particular, that each supply unit respectively specifies a corresponding supply current as the desired current and then also generates such a specified supply current.

In this case, a central open-loop control unit can control the individual supply units in an open-loop manner and, for example, can accordingly distribute an available power, that is to say, in particular, a power available from the wind, to the individual supply units which then each specify, on the basis of this, the desired current to be supplied and therefore set.

A wind farm can also be operated in the same manner, in which wind farm a central open-loop farm controller is provided and can pass corresponding desired values to individual wind turbines, and individual open-loop control devices can be respectively provided in the wind turbines and then control the individual supply units there.

A current according to a specified desired current value is therefore supplied in the current-impressing operating mode. If the momentary value or instantaneous value of the current changes, the corresponding supply unit reacts to this and attempts to counteract the change.

In the voltage-impressing mode, a voltage is specified instead and the relevant supply unit attempts to keep its supply voltage at this specified voltage value. Accordingly, the supply unit reacts to a voltage change.

If the momentary value of the voltage at the output with the corresponding supply unit now changes, this can immediately result in a reaction from the voltage-impressing supply unit. Such a voltage change may also be a frequency change or a phase jump in the voltage. The voltage-impressing unit can immediately react to this. This is how it differs from a current-impressing unit. In this respect, the current-impressing unit does not react to voltage changes.

An electric supply network nowadays has the voltage as a reference variable. That is to say, a network voltage is specified, but not a network current. The network is designed in such a manner that the network voltage is kept as constant as possible, whereas the supply of power, removal and transmission are achieved substantially by means of the current level. In other words, a current is fundamentally set according to requirements and initially has little significance with respect to the state of the electric supply network, in which case there are naturally exceptions if, for example, a short circuit occurs in the electric supply network or an interruption prevents electric current from being supplied. In contrast, a voltage change regularly means a change in a network property and can therefore provide better information on a change in the electric supply network, usually in a faster manner.

In any case, changes in the electric supply network usually initially become noticeable as voltage changes, but it also comes into consideration that they become noticeable only as voltage changes. The voltage-impressing units instantaneously react to these changes independently of higher-level closed-loop power control, whereas current-impressing units register such changes only later or possibly not at all. A reaction of a current-impressing unit to a change in the electric supply network is often taken into account only as a result of a change in the specification of its desired current, in particular by virtue of the fact that such a change in the network is captured using metrology and results in a changed desired current value on the basis of a closed-loop control rule.

As a result, voltage-impressing supply units therefore prove themselves, in particular, as network-impressing units which, as a result of their operating principle, counteract changes in the electric supply network in a particularly fast and therefore particularly dynamic manner. In contrast, current-impressing supply units are distinguished by the fact that they react to events in the network and supply current and therefore power to the electric supply network in a rather delayed manner.

As a result of the proposed changeover between a current-impressing mode, on the one hand, and a voltage-impressing mode, on the other hand, this special feature is used in terms of closed-loop control. It is therefore possible to change over to a voltage-impressing operating mode if particularly dynamic support is intended to be provided by the converter-controlled supply apparatuses.

As a result, it is also possible to react, in particular, to a changed topology in the electric supply network. If, for example, a nearby large power station is shut down, either temporarily or permanently, the closed-loop controlling effect of this large power station on the electric supply network is also canceled. In such a case in particular, a changeover to a voltage-impressing operating mode could be proposed in order to thereby move a part of such a property of the large power station mentioned by way of example to the electric supply network.

One embodiment proposes that an instantaneous operating mode can be changed between the current-impressing operating mode and the voltage-impressing operating mode in a plurality of steps or in a smooth transition. As a result, it is also possible to choose operating modes which are not exclusively voltage-impressing or exclusively current-impressing, but rather can be current-impressing or voltage-impressing to different extents. As a result, it is possible that the proposed choice between current-impressing and voltage-impressing need not only be restricted to extreme situations, but can also be dynamically adapted to corresponding network situations.

Criteria described above or below for choosing between the current-impressing operating mode and the voltage-impressing operating mode can analogously also be applied to corresponding operating modes in between.

One embodiment proposes that a changeover or choice is made between the current-impressing operating mode and the voltage-impressing operating mode on the basis of at least one of the following criteria, in which case the practice of choosing an operating mode between the current-impressing operating mode and the voltage-impressing operating mode on the basis thereof also comes into consideration here. The following are proposed as criteria:

- a measure of a voltage fluctuation in the electric supply network,
- a current limitation measure which is a measure of how often voltage-impressing units of the converter-controlled supply apparatus have reached a current limitation,
- a ratio of directly coupled synchronous generators supplying the electric supply network to converter-controlled supply apparatuses supplying the electric supply network, wherein the respectively currently supplied power, in particular the active power, or a ratio of the respectively supplied power and the active power, is used, in particular, as a reference variable,
- a measure of a frequency fluctuation in the electric supply network,
- a measure of phase jumps in the network,
- a network property of the electric supply network, in particular a network sensitivity,
- an operating state of the converter-controlled supply apparatus, in particular the currently supplied power, in particular the active power, with respect to a nominal power of the converter-controlled supply apparatus,
- proportion of voltage-impressing supply apparatuses supplying the electric supply network,
- proportion of wind turbines supplying the electric supply network,
- proportion of solar generators supplying the electric supply network,
- a short-circuit power at the network connection point,
- a network impedance at the network connection point,
- a short-circuit current ratio at the network connection point,
- detection of the formation of a subnetwork, in particular the formation of an isolated network, and
- an external changeover signal or selection signal, in particular a changeover signal predefined by an operator of the electric supply network.

One proposed criterion is therefore that a measure of a voltage fluctuation in the electric supply network is used. For example, an average fluctuation range can be taken as a basis. In this case, a voltage fluctuation can be recorded, for example, over a predetermined period, such as one minute, ten minutes or one hour, by recording the average value of the maximum voltage which occurs with respect to the average value of the minimum voltage which occurs, for example based on the root mean square value of the network voltage. The distance between maximum voltage values and minimum voltage values averaged in this manner can be taken as a basis as the fluctuation range. A limit value can then be taken as a basis, and the voltage-impressing operating mode or the current-impressing operating mode can be chosen depending on whether or not the fluctuation range recorded in this manner exceeds the limit value. The voltage-impressing operating mode is preferably chosen if the voltage fluctuations are high, that is to say the fluctuation range is large, that is to say the limit value is exceeded. If changing between the current-impressing operating mode and the voltage-impressing operating mode is carried out in a plurality of steps, a further limit value or further limit values can be provided for corresponding intermediate operating modes.

A current limitation measure, which is a measure of how often voltage-impressing units of the converter-controlled supply apparatus have reached a current limitation, is proposed as a possible criterion. It has been identified that voltage-impressing units operate in such a manner that, in the event of a change in the momentary value or instantaneous value of the voltage at the output of the corresponding supply unit, this can immediately result in a reaction of the voltage-impressing supply unit. The voltage-impressing unit attempts to retain the voltage as a result. This effect is desirable, but can result in a high current which is supplied by the voltage-impressing unit. If this current becomes so large that the relevant unit reaches a current limit, this is an indication of the fact that the unit can scarcely still retain or can no longer retain the voltage.

Therefore, the regular reaching of the current limit is taken as an indicator that more voltage-impressing units are required. Accordingly, it is proposed to change to a voltage-impressing mode with more units on the basis of this and to increase at least the proportion of voltage-impressing units.

In this case, it is preferably proposed to count how often the voltage-impressing units of the supply apparatus reach the current limitation for each unit in a specified test period and to take this as a basis as the current limit frequency and to change to a voltage-impressing mode and to increase at least the proportion of voltage-impressing units on the basis of this current limit frequency.

It is preferably proposed that the current limitation measure or the current limit frequency is taken into account on the basis of at least one closed-loop controller parameter of the voltage-impressing unit. This may be, in particular, a closed-loop controller gain or a closed-loop controller time constant. In particular, the at least one closed-loop controller parameter can be taken into account using a weighting, wherein the weighting is selected to be smaller, in particular, the smaller the closed-loop controller gain, namely the slope of a drooping characteristic used for the voltage-impressing unit. In this case, such a drooping characteristic for frequency tracking dependent on the active current indicates an amplification measure which indicates a linear relationship between the frequency to be set and the active current supplied or the active power supplied.

For example, it is proposed that, in the case of a strong closed-loop controller gain, which therefore corresponds to a high closed-loop controller gain or a small closed-loop controller time constant, the reaching of the current limitation is considered to be a strong indication of the fact that the proportion of voltage-impressing units is intended to be increased in comparison with a weaker closed-loop controller. In the case of a weaker closed-loop controller, it can therefore be expected that it will reach a limit sooner than a stronger closed-loop controller reaches this limit. The reaching of a limit is therefore rather normal in a weak closed-loop controller and is therefore not very conclusive with regard to the fact that a further voltage-impressing unit could be required for support. However, even in the case of a small current limitation measure or a low current limit frequency, it is necessary to change to a voltage-impressing mode in a strong closed-loop controller and to increase at least the proportion of voltage-impressing units.

The ratio of directly coupled synchronous generators supplying the electric supply network to converter-controlled supply apparatuses supplying the electric supply network provides information on the fundamental behavior or closed-loop control behavior of the electric supply network. In particular, directly coupled synchronous generators have a particular, to put it simply, rather voltage-impressing behavior with respect to the network. The fewer of such directly coupled synchronous generators influence the network, the more voltage-impressing supply units can be proposed in order to at least partially adopt this behavior of the directly coupled synchronous generators.

The number is not important in the behavior in this case, because directly coupled synchronous generators of large power stations usually have a multiple nominal power of a single wind turbine, but rather a power-based reference variable is taken as a basis here. It is proposed, in particular, to use the respectively instantaneous active powers of the directly coupled synchronous generators, on the one hand, and of the converter-controlled supply apparatuses, on the other hand. Alternatively, the nominal power can also be used in each case.

A further criterion is the measure of a frequency fluctuation. This frequency fluctuation measure can also be recorded in a similar manner to the measure of a voltage fluctuation by recording, for example, a fluctuation range of the frequency instead of a fluctuation range of the voltage. In this case too, it is preferably proposed that a voltage-impressing operating mode is chosen in the case of a high fluctuation range of the frequency, or the operating mode is adjusted at least in the direction of a voltage-impressing operating mode.

A measure of phase jumps in the network is proposed as a criterion according to another variant. Phase jumps are produced in the case of a sudden current change which can occur, for example, during load shedding. Such sudden current changes then result in such phase jumps as a result of a corresponding voltage change at a network impedance. It has been recognized that phase jumps in which the sinusoidal profile of the network voltage is suddenly shifted are prevented by means of synchronous generators which are directly coupled to the electric supply network. In this case, such phase jumps occur, in particular, when there are few synchronous generators of this type or when they are far away in the network since, the more synchronous generators act in the electric supply network, the more they can prevent phase jumps. Directly coupled synchronous generators, in particular, can form a network focal point. The further away from the network focal point a point is in the electric supply network, the greater the need for voltage-impressing units. It is therefore proposed to change over to a voltage-impressing mode and to increase at least a proportion of voltage-impressing units in the electric supply network, the more frequently and/or the more strongly phase jumps occur.

A network property of the electric supply network can likewise be used as a criterion. A network sensitivity is proposed, in particular. In this respect, a network property should be distinguished from an instantaneous state. An instantaneous state is, for example, the instantaneous frequency or the instantaneous voltage level. In contrast, a network property is a property of the network, that is to say how the network reacts to a change. Therefore, the consideration of a network sensitivity is proposed, in particular, as a network property. A network sensitivity is preferably defined here as a rate of a voltage change in response to a change in supplied active power and this is based on a network connection point, namely that network connection point at which the converter-controlled supply apparatus supplies power. A measure of how the electric supply network behaves with respect to changes can therefore be found. Accordingly, it is possible to choose between a current-impressing operating mode and a voltage-impressing operating mode on the basis of this or a meaningful intermediate stage can be chosen. In the case of a high network sensitivity, that is to say if the network reacts strongly to a change in the supply of active power, a voltage-impressing operating mode is preferably proposed.

An instantaneous operating state of the converter-controlled supply apparatus, in particular the currently supplied power, in particular the active power, is proposed as a further criterion. This can be set with respect to a nominal power of the converter-controlled supply apparatus. If the operating state is such that relatively little active power is supplied, the choice of the voltage-controlled operating mode can be proposed in order to improve the supporting properties of the converter-controlled supply apparatus.

A proportion of voltage-impressing supply apparatuses supplying the electric supply network can also be considered. The more voltage-impressing supply apparatuses are already active in the electric supply network, the less a voltage-impressing operating mode needs to be chosen. In this case too, the proportion of voltage-impressing supply apparatuses can be considered, in particular in the sense of their supplying active power.

As a further criterion, it is proposed to consider how large a proportion of wind turbines or wind farms supplying the electric supply network is. The supplied active power is proposed as a measure in this case too. Considering this active power means that there is virtually also no need to distinguish between a wind turbine proportion or a wind farm proportion. As a result of this power-based consideration of the proportion of wind turbines, it is therefore possible to consider how greatly wind fluctuations can affect the power which is supplied overall to the electric supply network, that is to say how large the supplied active power proportion which depends on the wind is. In this case too, a voltage-impressing mode can be proposed in the case of a large proportion of wind turbines.

A proportion of solar generators supplying the electric supply network is likewise proposed as a criterion. Here, there is a similar consideration to that for the proportion of wind turbines, in which case the consideration of supplied active power in a manner dependent on solar or light irradiation is taken as a basis here. The greater the proportion of solar-dependent active power, the more likely a voltage-impressing operating mode is proposed.

The consideration of an instantaneous supply situation also comes into consideration for considering the wind proportion and/or the solar proportion.

On the other hand, in the case of a large proportion of wind turbines in the electric supply network, it can also be proposed to choose rather a current-impressing operating mode because wind turbines as such also already have fast closed-loop control properties during operation in the current-impressing operating mode.

The consideration of a short-circuit power at the network connection point is proposed as a further criterion. This denotes the short-circuit power which could be provided by the electric supply network at the network connection point in the event of a short circuit. In this respect, the short-circuit power at the network connection point is likewise a network property of the electric supply network with respect to this network connection point. The higher such a short-circuit power is, the stronger or more stable the electric supply network is in this region. Accordingly, there is a need for less closed-loop control and it is proposed, in this respect, to switch to a voltage-impressing operating mode in the case of a low short-circuit power.

A network impedance at the network connection point can likewise be provided as a criterion, and the lower the network impedance there, the less the need for a voltage-impressing operating mode. The voltage-impressing operating mode is therefore proposed if the network impedance is high, for example exceeds a predetermined limit value.

A short-circuit current ratio at the network connection point is a further criterion, on the basis of which it is possible to choose between a voltage-impressing operating mode and a current-impressing operating mode. The short-circuit current ratio denotes the ratio of a short-circuit power which can be provided on the network side at the network connection point with respect to the nominal power of the supply apparatus connected to the network connection point there. The lower the short-circuit current ratio, the more the network connection point is utilized by the connected supply apparatus. Accordingly, a supply by means of such a supply apparatus at the network connection point is more stable, the higher the short-circuit current ratio. For example, a short-circuit current ratio of 10 or even a short-circuit current ratio of 6 usually represents a very stable state. For a short-circuit current ratio of 4 or less, it can be proposed to increase a proportion of voltage-impressing supply units. In the case of a short-circuit current ratio of 2 or less, in particular in the case of a short-circuit current ratio of less than 1.5, it is preferably proposed to choose the voltage-impressing operating mode.

The detection of the formation of a subnetwork can likewise be a preferred criterion. The formation of a subnetwork denotes a situation in which parts of the electric supply network have separated from one another. The remaining part, that is to say the remaining subnetwork, in which the network connection point of the converter-controlled supply apparatus is situated, can be weakened by such formation of a subnetwork and can tend to instabilities or at least an oscillating behavior. Accordingly, it is proposed to choose the voltage-impressing operating mode if the formation of a subnetwork is detected.

A special situation of the formation of a subnetwork is the formation of an isolated network, in which the subnetwork, to which the supply apparatus is connected via its network connection point, forms a separate system. In this case, the producers connected to this isolated network must independently carry out the closed-loop and open-loop control of this isolated network. Such a situation, in particular, can be taken into account by means of a voltage-impressing operating mode, at least can be better taken into account than by means of a substantially current-impressing operating mode.

A further criterion is that a choice is made by means of an external changeover signal. Such a changeover signal can come, in particular, from an operator of the electric supply network, that is to say the network operator, and it is therefore possible for this network operator to act on the closed-loop control properties of this supply apparatus. For example, the network operator can therefore also change the converter-controlled supply apparatus to an operating mode with greater closed-loop control, namely the voltage-impressing operating mode, in an anticipatory manner.

Such a changeover signal or selection signal can also be configured in such a manner that a mixed operating mode is set. A mixed operating mode is an operating mode which has or combines current-impressing and voltage-impressing properties. Such a combination and therefore such a mixed operating mode can be achieved, in particular, by virtue of the fact that some supply units operate in a current-impressing manner and some operate in a voltage-impressing manner.

The criteria according to which a changeover is made between the current-impressing operating mode and the voltage-impressing operating mode or according to which a switch is made to a mixed operating mode in between can also be combined. Two or more features can fundamentally be combined in such a manner that each criterion is normalized to a standard value. An example would be to assume a value of 0 to 1, that is to say 0 to 100%, for each criterion. Such a value can indicate the respective criterion as such.

However, it also comes into consideration that only the result of the criterion is accordingly changed to such a unit value. That is to say, each criterion is initially individually considered and evaluated. The evaluation is then changed to a standard range. For example, the result of an evaluation may be that there is a low requirement for changing over to a voltage-impressing operating mode. This requirement can be stated as 30%, for example, or it emerges from this that there is a high requirement for such a changeover, which can be stated as 70%, for example. Such a requirement can likewise be stated, for each criterion, as a requirement value for changing over or not changing over with a value of 0 to 1, that is to say 0 to 100%. If a plurality of criteria are then taken into account, their output requirement values, that is to say the described values which can be in the range from 0 to 1 or 0 to 100%, can be averaged.

It also comes into consideration that the criteria are also provided with a weighting, with the result that one criterion is weighted with a value of 5 and one criterion is weighted with a value of 2, for example. The joint consideration of the respective requirement values of the criteria can then be carried out, for example, in such a manner that each requirement value is multiplied by the respective weighting of the underlying criterion and an average value is formed from the results determined in this manner for each criterion by adding all requirement values weighted in this manner and dividing this sum by the sum of the weighting factors, to name just one example.

One embodiment proposes that a changeover open-loop controller is provided for the purpose of changing over between the current-impressing operating mode and the voltage-impressing operating mode, which also comprises the selection of an intermediate position, and this changeover open-loop controller has implemented a changeover criterion. The changeover criterion is therefore checked in this changeover open-loop controller and a changeover is then provided if necessary.

Additionally or alternatively, the changeover open-loop controller changes over on the basis of at least one of the criteria explained above. The criteria, or at least one of said criteria, can therefore be implemented by means of such a changeover open-loop controller.

The operation of changing over by means of the changeover open-loop controller can be carried out, for example, in such a manner that the changeover open-loop controller transmits a corresponding changeover signal to affected supply units and, as a result, the latter change from a current-impressing operating mode to a voltage-impressing operating mode. For a changeover to a mixed operating mode in particular, provision may be made for the changeover open-loop controller to be coupled to a plurality of supply units for this purpose and for the changeover open-loop controller to change some of these supply units to the current-impressing operating mode and to change others of the supply units to the voltage-impressing operating mode.

The mixed mode can thereby be accordingly subjected to open-loop control depending on the number of supply units chosen for the respective operating mode. A pure current-impressing or voltage-impressing operating mode can be achieved when all of these voltage units are changed to the current-impressing or voltage-impressing mode by the changeover open-loop controller.

Additionally or alternatively, it is proposed that an adaptation algorithm is implemented in the changeover open-loop controller. This algorithm can use a criterion and can qualitatively and/or quantitatively assess changes after a changeover by means of a quality measure. The consideration of a mixed operating mode at least according to one embodiment is also proposed here.

An evaluation can now be carried out, for example, in order to determine whether a voltage fluctuation, to name one example, after changing over from a current-impressing operating mode to a voltage-impressing operating mode was able to be reduced and how greatly it was able to be reduced. If it is observed in this example that the voltage fluctuation has decreased significantly, the changeover can be fundamentally assessed as good. If the effect was low, the practice of already changing over to the voltage-impressing operating mode earlier, that is to say in the case of lower voltage fluctuations, can come into consideration, for example.

If a mixed mode is concomitantly considered in particular, to remain with the example of the voltage fluctuation, the proportion of voltage-impressing units, that is to say units which have changed to a voltage-impressing operating mode, can be increased if it has been found that the previously chosen mixed form, that is to say the previously chosen mixed operating mode, was not yet sufficient.

The knowledge obtained in this manner, with or without the mixed operating mode, can be implemented and stored in such a manner that the changeover open-loop controller is generally changed, namely adapted. The changes in the changeover algorithms determined here are then provided for the future by means of an appropriate adaptation. In the simplest example, this can mean that, for the example of the voltage fluctuation, a voltage limit for changing over is changed and this changed limit is used the next time. Even more complex relationships can be adapted in this manner, however.

Another embodiment proposes that it is additionally possible to choose a frequency-impressing mode in which the converter-controlled supply apparatus performs open-loop or closed-loop control to a desired frequency value, in particular that it is possible to change over between the frequency-impressing mode and an open-frequency operating mode. In this case, the converter-controlled supply apparatus performs closed-loop control to a frequency captured in the electric supply network in the open-frequency operating mode. If the supply apparatus is therefore in the open-frequency operating mode, a frequency captured in the electric supply network is taken as a basis and the corresponding desired signal is specified on the basis thereof. This means that the voltage with this frequency value is specified in the voltage-impressing mode and the current, that is to say the desired current, with this frequency value is specified in the current-impressing mode. In the frequency-impressing mode, a voltage signal at a specified frequency is generated and this specified frequency can be tracked to the network frequency. For this purpose, it is proposed that this tracking of the frequency is carried out with a large time constant.

If the supply apparatus now changes to the frequency-impressing mode, which is provided for a voltage-impressing mode in particular, the corresponding desired value, that is to say the desired voltage value in the voltage-impressing mode in particular, is not tracked to the frequency captured in the electric supply network or is possibly tracked only with a delay. Instead, a frequency is specified and the desired voltage value, that is to say the sequence of instantaneous values, is then specified with this specified frequency. As a result, the supply apparatus can undertake or assist with frequency control or can contribute to a higher frequency stability. Such a frequency-impressing mode is advantageous, in particular, if the formation of a subnetwork is detected, in particular if the formation of an isolated network is detected, and is preferably proposed then.

Another embodiment proposes that the converter-controlled supply device outputs a voltage signal at a voltage output. The voltage output is connected to an inductor, with the result that an output current and an output voltage are produced at an output of the inductor on the basis of the voltage signal, a voltage in the electric supply network and the inductor. In this case, an output voltage is produced at the output of the inductor and an output current is likewise produced at the output of the inductor. This output voltage and this output current are used for further closed-loop control steps.

On the basis of this, closed-loop current control is used in the current-impressing operating mode and the output current described is fed back as an actual value. Accordingly, it is compared with a desired value for the output current, in the sense of a desired/actual value comparison used in closed-loop control.

Additionally or alternatively, closed-loop voltage control is used in the voltage-impressing operating mode and the described output voltage at the output of the inductor is fed back as an actual value. This can then be compared with a desired voltage value.

This feedback and the comparison of the output current or the output voltage can be understood as meaning a comparison of momentary values.

Another embodiment proposes that a changeover or choice between the voltage-impressing operating mode and the current-impressing operating mode is performed by means of a computer-implemented open-loop controller. Criteria and open-loop control rules and resulting open-loop control commands can therefore be easily implemented in the computer-implemented open-loop controller. Any changes can be achieved by means of reprogramming or by installing an update. In addition, a more complex open-loop controller can also be easily implemented here, including an adaptation algorithm.

A capture operation for feeding back the output current and the output voltage as permanent feedback is provided, in particular, for this implementation by means of a computer-implemented open-loop controller. Both variables are therefore fed back and the computer-implemented open-loop controller can therefore resort to both variables and can choose between the captured output current and the captured output voltage as the actual value which is fed back. It is therefore also possible to easily change between operating modes in the short term and briefly.

It is proposed, in particular, that such a computer-implemented open-loop controller is provided on each supply unit. Requests for a changeover can possibly be passed from a superordinate central open-loop control unit, as a request signal, to each of these computer-implemented open-loop controllers.

Another embodiment proposes that the converter-controlled supply apparatus has at least one converter in order to generate the voltage signal as a pulsed voltage signal by means of a pulse pattern, and wherein the pulse pattern is generated on the basis of the chosen operating mode and the actual value which has been fed back. If the current-impressing operating mode is therefore chosen as the operating mode, the actual value of the output current which has been fed back is accordingly used to set the momentary values and is compared in this case with a corresponding desired current, namely the sequence of instantaneous values in each case. Accordingly, when the voltage-impressing operating mode is chosen, the actual voltage signal which has been fed back is used and is compared with a desired voltage value. It is therefore easily possible to change over between the current-impressing mode and the voltage-impressing mode.

Another embodiment proposes that a current band or a voltage band is predefined as the desired current value or the desired voltage value. The output current to be generated or the output voltage to be generated then only needs to be achieved to such an extent that it is in the current band or the voltage band. This also makes it possible to avoid excessive closed-loop control activity. Provision may also be made, in particular, for no closed-loop control to be carried out as long as the actual current signal or the actual voltage signal is in the corresponding band, that is to say in the current band or the voltage band. This also respectively relates to the sequence of instantaneous values.

The invention also proposes a supply apparatus, in particular a wind turbine or a wind farm. This supply apparatus is provided for the purpose of supplying electric power to an electric supply network at a network connection point. It has at least one converter or inverter for carrying out the supply operation, with the result that the supply apparatus operates in a converter-controlled manner. The converter or inverter ensures, in particular, that a supply signal with a corresponding voltage amplitude, frequency and phase angle is generated for the purpose of supplying the electric supply network. It is not important whether this is carried out by an inverter which has a DC voltage as a supply source on the input side or by a converter which has an AC voltage as an energy source on the input side as long as the converter or inverter outputs a corresponding signal with a corresponding amplitude, frequency and phase on the output side.

For this supply apparatus, it is now proposed that it has at least one changeover open-loop controller for changing over between a current-impressing operating mode and a voltage-impressing operating mode. Such a changeover open-loop controller can preferably be implemented by means of a computer-implemented open-loop controller.

In this case, the current-impressing operating mode is an operating mode in which open-loop or closed-loop control to a desired current value is carried out and the voltage-impressing operating mode is an operating mode in which open-loop or closed-loop control to a desired voltage value is carried out.

It comes into consideration in this case too that the at least one changeover open-loop controller also provides for the switching or choosing of a mixed operating mode.

The supply apparatus preferably operates in the manner carried out according to at least one above-described embodiment of the described method for supplying electric power to the electric supply network.

As a result, the possibilities and advantages described in connection with at least one embodiment of the supply method can be implemented by means of this supply apparatus.

BRIEF DESCRIPTION OF THE SEVERAL VIEWS OF THE DRAWINGS

The invention is now explained in more detail below, by way of example, on the basis of embodiments with reference to the accompanying figures.

DETAILED DESCRIPTION

Figure 1:
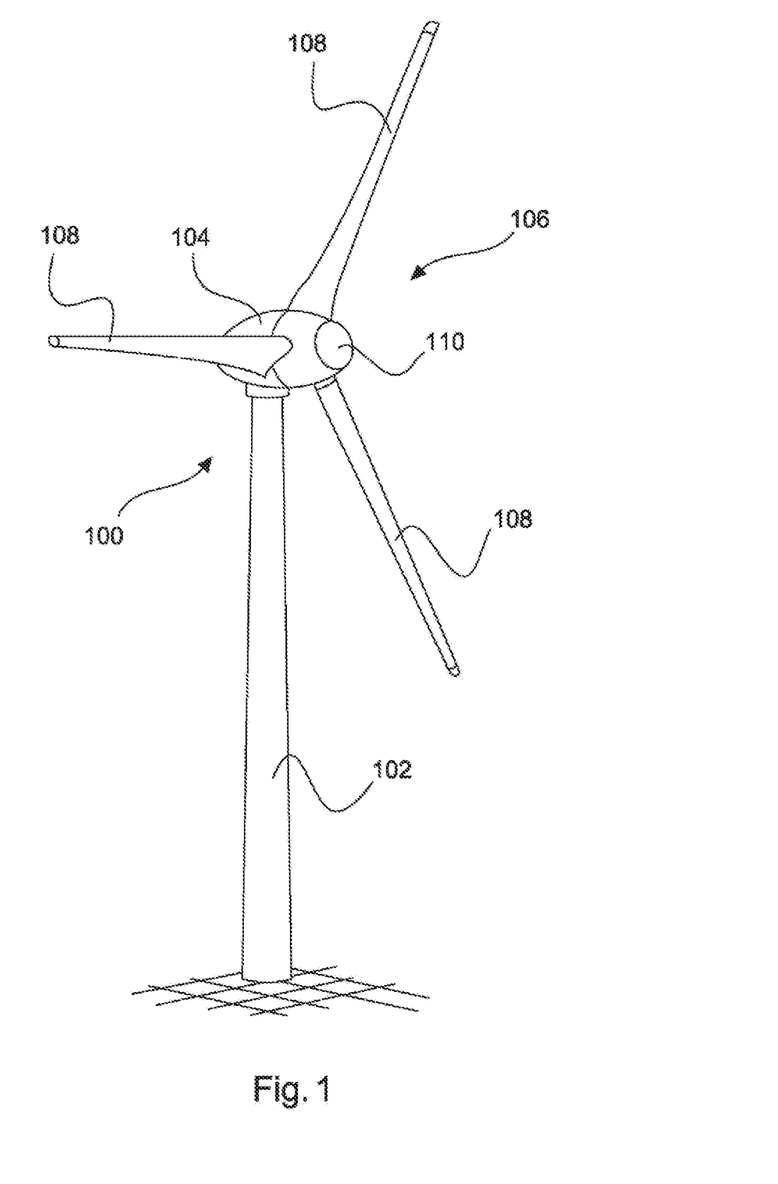
FIG. 1 shows a perspective illustration of a wind turbine.

FIG. 1 shows a wind turbine 100 having a tower 102 and a nacelle 104. A rotor 106 having three rotor blades 108 and a spinner 110 is arranged on the nacelle 104. The rotor 106 is caused to rotate by the wind during operation and thereby drives a generator in the nacelle 104.

Figure 2:
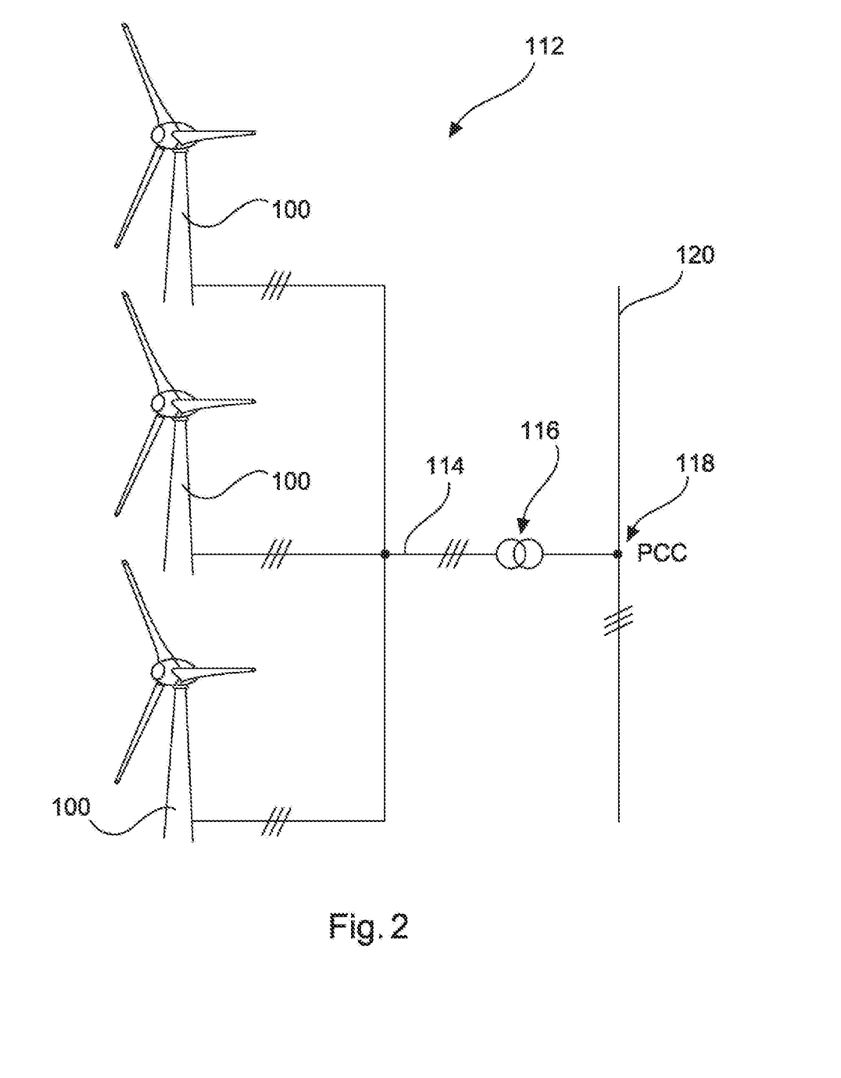
FIG. 2 shows a schematic illustration of a wind farm.

FIG. 2 shows a wind farm 112 having, by way of example, three wind turbines 100 which may be identical or different. The three wind turbines 100 are therefore representative of fundamentally an arbitrary number of wind turbines in a wind farm 112. The wind turbines 100 provide their power, namely in particular the generated current, via an electrical farm network 114. In this case, the respectively generated currents or powers from the individual wind turbines 100 are added, and a transformer 116 is usually provided and steps up the voltage in the farm in order to then supply the supply network 120 at the supply point 118 which is also generally referred to as the PCC. FIG. 2 is only a simplified illustration of a wind farm 112 which does not show an open-loop controller, for example, even though an open-loop controller is naturally present. The farm network 114 can also be configured differently, for example, by virtue of a transformer also being present, for example, at the output of each wind turbine 100, to name just one other exemplary embodiment.

Figure 3:
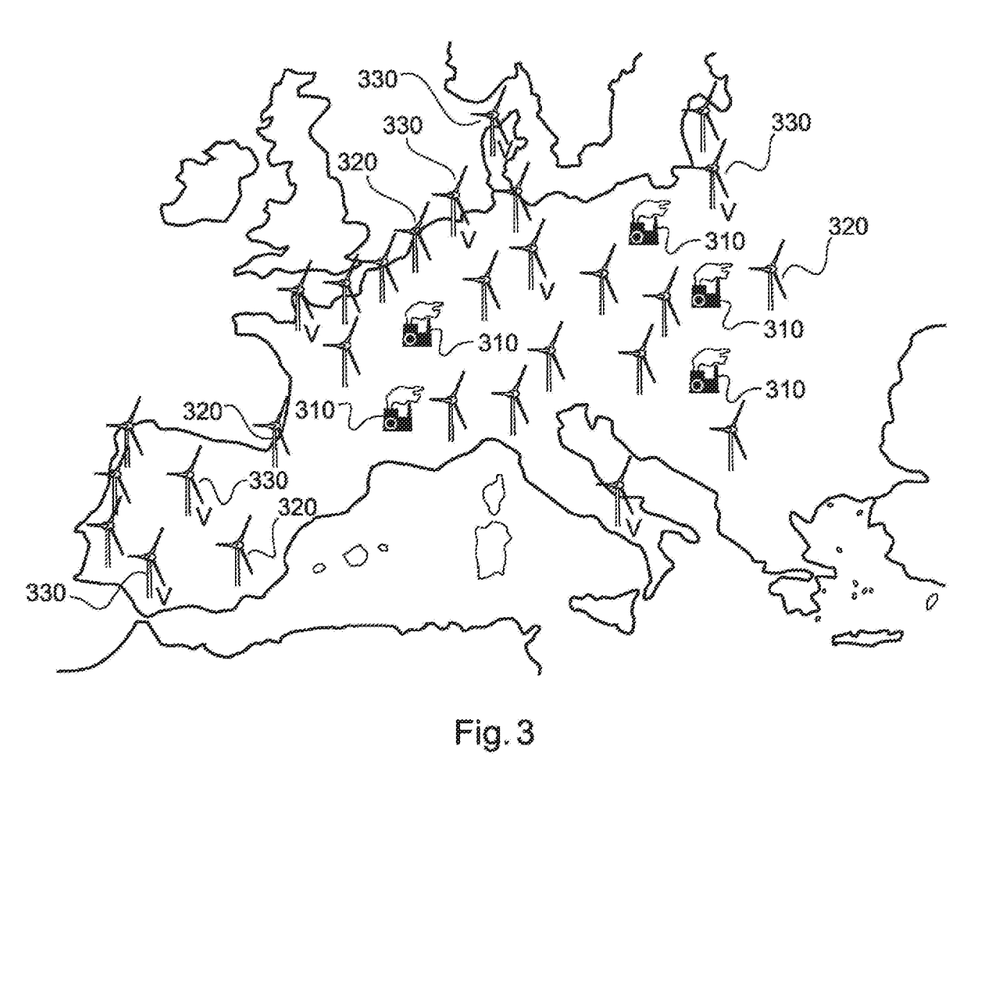
FIG. 3 illustrates a geographical distribution of current-impressing and voltage-impressing suppliers using the example of the European integrated network.

FIG. 3 shows a section of an outline of Europe and a section in which the European integrated network largely forms the electric supply network. By way of illustration, wind farms and large power stations are depicted in FIG. 3 in a manner distributed over the region. These are only examples of various further producers and, in this respect, this illustration is not conclusive for the European integrated network.

In any case, some large power stations 310 and different wind farms are shown. Specifically, wind farms 320 operating in a current-impressing manner and voltage-impressing wind farms 330 are depicted. For the sake of better clarity, only some reference numerals are depicted, but the two different wind farms 320 and 330 may also be distinguished from one another on the basis of the illustrated symbol. For current-impressing wind farms 320, a simple wind turbine is indicated as a symbol and, for voltage-impressing wind farms 330, a simple wind turbine with a V at the base of the tower is selected as the symbol. The letter V at the base of the tower is therefore intended to illustrate the voltage impression.

FIG. 3 therefore substantially illustrates that voltage-impressing suppliers are distributed over the geographical region shown, namely either as large power stations 310 or as voltage-impressing wind farms 330. For example, without this intending to reflect the current actual state, no large power stations 310, but rather voltage-impressing wind farms 330, are illustrated on the Iberian Peninsula, the Italian Peninsula, in Denmark and in Brittany. However, not only voltage-impressing wind farms but also current-impressing wind farms 320 are also illustrated there. A good distribution has therefore been achieved.

However, the distribution shown in FIG. 3 can be variable. For example, large power stations may be shut down. In Germany in particular, some nuclear power plants will be shut down in the near future. Large power stations can also be temporarily connected or disconnected, however, in particular gas power plants which are spontaneously connected or disconnected in order to support the electric supply network, or pumped-storage power plants, to name just a few examples. A variation as a result of a change in the wind conditions can also result with regard to the amount of active power supplied. For example, provision may be made, to remain with the illustrative example in FIG. 3, to change over further wind farms 320 which are currently operating in a current-impressing manner to a voltage-impressing operating mode or a predominantly voltage-impressing operating mode on the Iberian Peninsula if the voltage-impressing wind farms 330 shown supply less active power and can therefore also carry out closed-loop control to a lesser extent, for example on account of weak wind.

Figure 4:
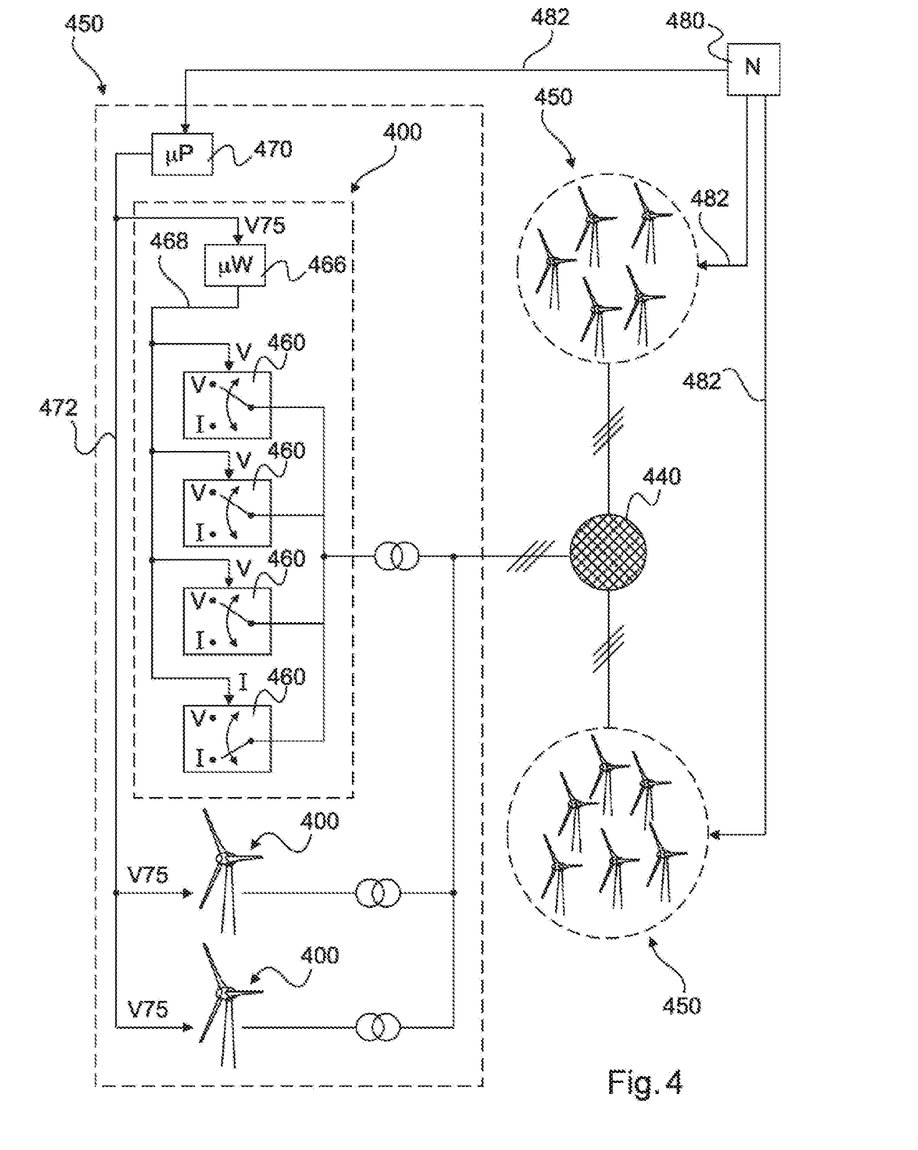
FIG. 4 schematically shows a network section of an electric supply network having a plurality of connected wind farms.

An implementation of such an overall concept for an electric supply network is illustrated in FIG. 4. FIG. 4 fundamentally schematically shows only an electric supply network 440, of which all elements which are also described below fundamentally form a part. The electric supply network 440 is nevertheless also represented by means of a conventional symbol in FIG. 4.

FIG. 4 now shows, by way of example, three wind farms 450. The same reference sign has been used for all three wind farms even though these wind farms can naturally differ in terms of their type or their instantaneous operating mode. One of the wind farms 460, which is illustrated in the left-hand half, is illustrated in greater detail and has, by way of example, three wind turbines 400. These three wind turbines which may be representative of further wind turbines may be structurally identical, for example. For better clarity, all three exemplary wind turbines are indicated using the same reference sign 400. Two of these wind turbines 400 are illustrated only as a symbol and one wind turbine 400 is illustrated, for the purpose of illustrating the structure to be explained, as a dashed block which has, by way of example, four supply units 460. Each of these supply units 460 may be representative of an inverter or of a switchgear cabinet which comprises such an inverter.

For each of these supply units 460, it is possible to change over between a current-impressing operating mode I and a voltage-impressing operating mode V. This is symbolized in each of the supply units 460 by means of a switch which can choose between the current-impressing operating mode I and the voltage-impressing operating mode V. By way of example, a current-impressing operating mode I is chosen here in one of the supply units 460, namely in the supply unit illustrated at the bottom according to the illustration in FIG. 4, whereas the remaining three exemplary supply units 460 symbolize, by means of the switch position, that they are operating in the voltage-impressing operating mode.

Such a choice can be made by the wind turbine open-loop controller 466. The wind turbine open-loop controller 466 is connected for this purpose to each supply unit 460 via a wind turbine data bus 468. Corresponding open-loop control commands can be passed to the supply units 460 via this wind turbine data bus 468. FIG. 4 indicates that this data bus 468 transmits an open-loop control command with the content I, that is to say with the open-loop control command to choose the current-impressing operating mode, to the supply unit 460 illustrated at the very bottom. Accordingly, the remaining three exemplary supply units 460 receive, as an open-loop control command, the information V, that is to say the open-loop control command to choose the voltage-impressing operating mode V.

In this case, the wind turbine open-loop controller 466 can implement a superordinate open-loop control command from the wind farm open-loop control unit 470. In this case, the wind farm open-loop control unit 470 can pass corresponding open-loop control commands to the individual wind turbines 400 via a farm data bus 472. In the example illustrated in FIG. 4, the open-loop control command which is passed to the first wind turbine 400 may be, for example, that the intention is to operate at 75% in a voltage-impressing manner. It is illustrated there on the input side of the wind turbine open-loop controller 466 as "V75" and can represent operation at 75% in a voltage-impressing manner. The same signal is also respectively passed to the other two wind turbines 400, namely the signal V75, but different signals can also be passed to the wind turbines 400.

The wind farm open-loop control unit 470 in turn receives a selection signal transmitted by a network operator 480. This is only an example and, instead or in addition, the wind farm 450 or the wind farm open-loop control unit 470 can also provide for a changeover or choice of a corresponding operating mode on the basis of other criteria.

However, in the illustrative example in FIG. 4, provision is made for the network operator 480 to transmit a corresponding selection signal to the wind farms 450 via an operator data connection 482. In this case, no high demands with regard to the transmission rate need to be imposed on this operator data connection 482 because a changeover between the current-impressing operating mode and the voltage-impressing operating mode or a mixed operating mode is neither constantly provided nor particularly time-critical and requires only a small volume of data for transmission.

Figure 5:
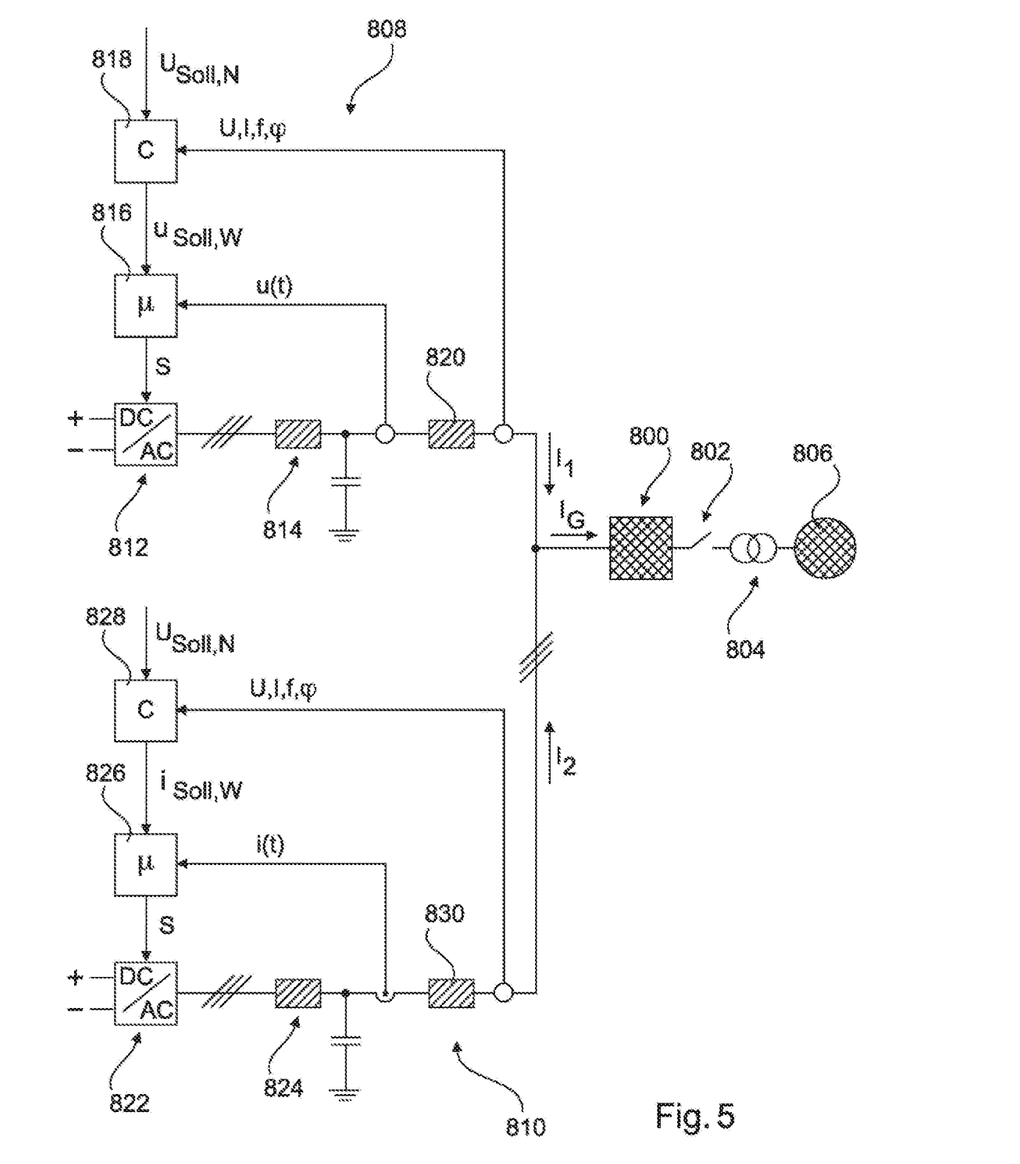
FIG. 5 schematically shows an illustration with a current-impressing supply unit and a voltage-impressing supply unit.

FIG. 5 illustrates how a converter or an inverter, that is to say how a supply unit, can implement a current-impressing operating mode or a voltage-impressing operating mode.

FIG. 5 shows, in an illustrative manner, a connection structure 800 which can be coupled to an electric supply network 806 via an isolating switch 802 and a connection transformer 804. The connection structure 800 may be, for example, a connection of a plurality of current-impressing or voltage-impressing units which together provide electric power via the connection structure. The connection structure may form or comprise, for example, a link between all power cabinets in a wind turbine.

By way of illustration, a voltage-impressing unit 808 and a current-impressing unit 810, which themselves are also part of the connection structure 800, are shown. Both units can be accommodated in a wind turbine, for example. Provision is also made for said units to be able to be changed over, that is to say that they can each operate either as a voltage-impressing unit or as a current-impressing unit. However, corresponding sensors are not illustrated for the sake of simplicity.

The voltage-impressing unit 808 has a voltage-impressing inverter 812 which generates a voltage u(t) at its output, which voltage is measured, in particular, at the output of the first output filter 814 indicated. The voltage u(t) is continuously measured and is fed back to the first microcontroller 816. In this respect, the first microcontroller 816 evaluates the instantaneous values of this measured voltage u(t). Like the voltage which is output, these measured values are also three-phase. However, it is not necessary to go into details of this three-phase nature in order to explain FIG. 6. This also applies to the current-impressing unit 810.

The first microcontroller 816 also receives a desired voltage value $u_{soll,w}$ which specifies the voltage u(t) to be set in terms of absolute value, frequency and phase.

This desired value $u_{soll,w}$ is generated in the first inverter open-loop controller 818. It depends on a desired voltage $U_{soll,N}$ and the measured values U, I, f, φ which are measured at the output of the first network inductor 820.

The current-impressing unit 810 which operates in a current-impressing manner has a current-impressing inverter 822 which operates in a similar manner to the voltage-impressing inverter 812, but carries out closed-loop control to an output current i(t). This output current i(t) is captured at the output of the second output filter 824 indicated and is evaluated in the second microcontroller 826. The second microcontroller 826 therefore receives a desired current value $i_{soll,w}$ which specifies the current i(t) to be generated in terms of absolute value, frequency and phase. The second microcontroller 826 accordingly carries out open-loop control of the switching actions in the current-impressing inverter 822, which is indicated by the reference sign S. For the rest, the first microcontroller 816 accordingly carries out open-loop control of switching actions in the inverter 812.

The desired current value $i_{soll,w}$ is determined in the second inverter open-loop controller 828. It depends on the voltage U, the current I, the frequency f and the phase angle φ, and these variables are captured at the output of the second network inductor 830. The second inverter open-loop controller 828 also receives, as an input variable, a desired voltage $U_{soll,N}$. The first and second inverter open-loop controllers 818 and 828 can also be combined in a common inverter open-loop controller.

The voltage-impressing unit 808 therefore generates a first current $I_1$ as a result and the current-impressing unit 810 generates a second current $I_2$ as a result. These two currents $I_1$ and $I_2$ are added to form the common current $I_G$. The latter flows, in an illustrative manner, into the symbolized farm network 800. This should be understood in an illustrative manner because the voltage-impressing unit 808 and the current-impressing unit 810 are also part of the farm network 800. In this respect, the common current $I_G$ flows into the remaining part of the farm network.

During operation, if a reactive power jump or a phase jump occurs in the farm network 800 for example, this becomes noticeable in the overall current $I_G$. Since the output current $I_2$ of the current-impressing unit 810 is subjected to closed-loop control by the overall current, a change in the common current $I_G$ therefore initially results only in a change in the first current $I_1$ of the voltage-impressing unit 808.

The change in the common current $I_G$ therefore initially changed the first current $I_1$ and this was captured by the first inverter open-loop controller 818. The first inverter open-loop controller 818 captures a new value for a voltage amplitude and/or a frequency therefrom on the basis of a reactive power droop or an active power droop. Accordingly, the desired voltage signal $u_{soll,w}$ is adapted and is transferred to the first microcontroller 816. The latter then accordingly controls the voltage-impressing inverter 812. Accordingly, this results in a change in the voltage amplitude and/or the frequency of the voltage and this is measured by the current-impressing unit 810 by means of the measurement at the output of the second network inductor 830 and is evaluated in the second inverter open-loop controller 828. A new reactive power value and/or a new active power value is/are then calculated on the basis of this, namely on the basis of the underlying reactive power droop or active power droop. A desired current signal $I_{soll,w}$ is accordingly specified and is transferred to the second microcontroller 826. The latter then accordingly controls the current-impressing inverter 822. The result is that the second current $I_2$ now changes, as a result of which the first current $I_1$ also changes and in turn results in a new adaptation by the first inverter open-loop controller 818, namely again on the basis of the corresponding droops, that is to say the reactive power droop and/or the active power droop.

As a result, the voltage-impressing unit 808 and the current-impressing unit 810 are therefore adjusted with respect to one another in such a manner that they supply a corresponding active or reactive power according to the droop relevant to them with the same voltage deviation or the same frequency.

FIG. 5 describes the basic operation of a voltage-impressing unit 808 and of a current-impressing unit and these two units can also be operated together and supply the same network. However, substantially more than only two units can also cooperate. Each unit per se can operate as described above. It is now proposed to place an emphasis on a voltage-impressing mode or a current-impressing mode depending on the situation. In the simplified example in FIG. 5, this would mean that both units operate in a voltage-impressing manner or both units operate in a current-impressing manner. In the case of many units, that is to say many more than two units, it may be sufficient, depending on the situation, for not all of the units, but most of the units or at least a plurality of the units, to operate in a voltage-impressing or current-impressing manner.

Figure 6:
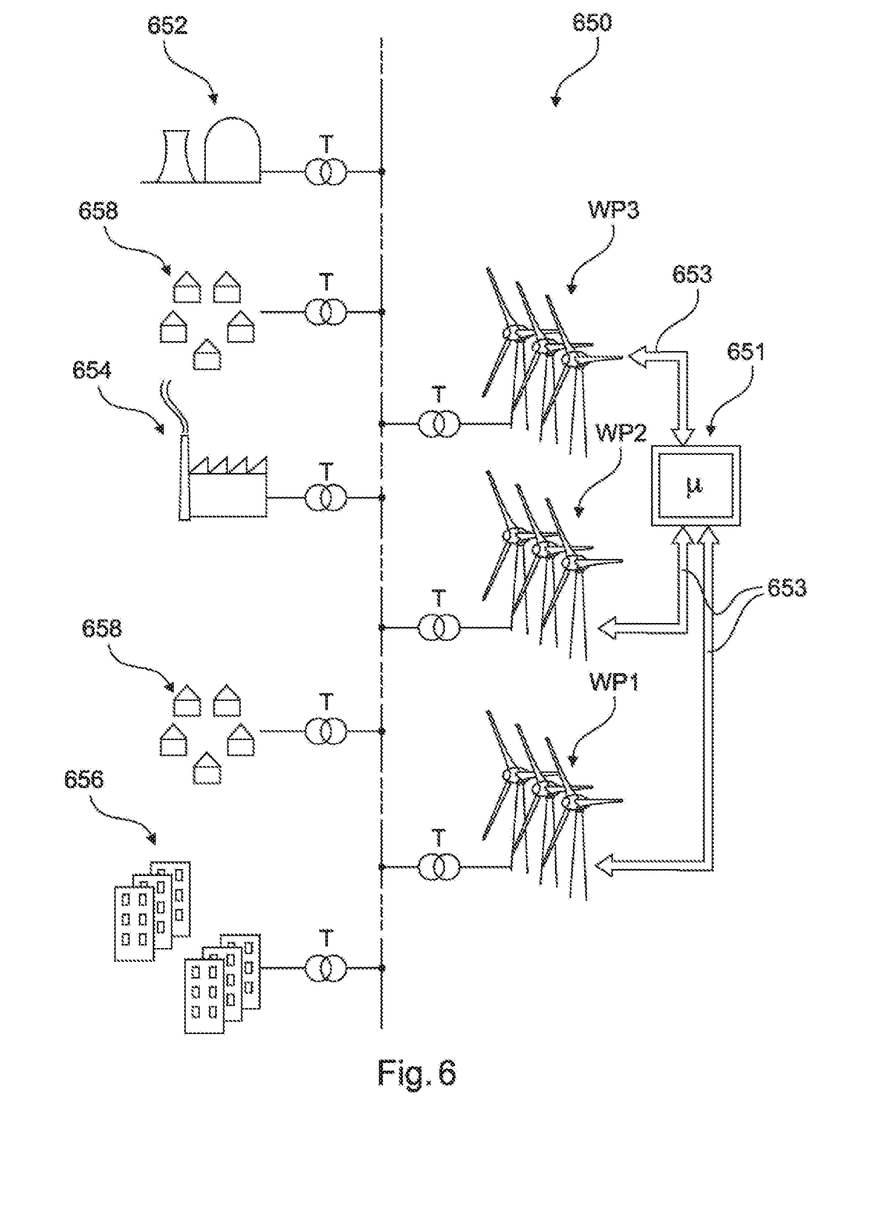
FIG. 6 illustrates a network section of an electric supply network.

FIG. 6 illustrates a network section 650 of an electric supply network having a large power station 652, residential areas 658, an industrial consumer 654, a town 656 and a plurality of wind farms WP1 to WP3. These elements are also each examples of further elements of their type and, for illustration, are each connected to a common line via a transformer T. Each wind farm WP1 to WP3 forms a converter-controlled supply apparatus.

The exemplary wind farms WP1 to WP3 can be used to supply electric power to the electric supply network 650. These wind farms WP1 to WP3 fundamentally operate in a current-impressing manner, but may also comprise voltage-impressing supply units and may operate supply units either in a current-impressing or in a voltage-impressing manner. They can also be controlled in a coordinated and open-loop manner by the network open-loop control device 651, in which case this relates, in particular, to open-loop control of desired values. Each wind turbine independently carries out open-loop or closed-loop control of momentary values or instantaneous values. The network open-loop control device 651 can also control a changeover of one or more wind farms WP1 to WP3 in an open-loop manner from the current-impressing mode to the voltage-impressing operating mode, or vice versa. It may also specify a proportion of current-impressing or voltage-impressing supply units and can thereby change between a current-impressing operating mode and a voltage-impressing operating mode in a plurality of steps or in a smooth transition.

In order to transmit such specifications, including the transmission of desired values, provision is made of a transmission device or media which transmits data, via a data transmission channel 653, to the wind farms WP1 to WP3, which data are each input there via an interface. For this purpose, each wind farm WP1 to WP3 can have a central farm open-loop control unit in order to divide the values specified by the network open-loop control device 651 among the wind turbines in the wind farm. In this case, each wind turbine can have a plurality of supply units, and each wind turbine can therefore also gradually change from a current-impressing operating mode to a voltage-impressing operating mode.

Communication between the wind farms WP1 to WP3 and the network open-loop control device 651 can also be carried out in a bidirectional manner, as illustrated by the respective illustration of the data transmission channels with arrows in both directions. The transmission can be carried out in a wired or wireless manner or in a combination of the two.

As a result, the network open-loop control device 651 can also take into account data relating to the respective wind farm. As a result, it can receive and evaluate information relating to current limitations which have been reached, for example. The bidirectional transmission of information also makes it possible for the wind farm to act as a measuring sensor and to record measured values of the electric supply network 650, in particular the voltage and frequency, and to transmit these measurement data to the network open-loop control device for further use. Information relating to network states or network properties, in particular, can be received therefrom and evaluated in order to then take into account criteria for changing over between the current-impressing operating mode and the voltage-impressing operating mode.

According to one example, it may be the case that a power plant, for example the power plant 652, is shut down. As a result, a phase jump and/or a frequency change can then occur. This can be captured, for example, by the network open-loop control device 651 or this is transmitted to the network open-loop control device as information by a network operator. The network open-loop control device 651 can then pass a signal to increase voltage-impressing properties to the wind farms WP1 to WP3 or to at least one of the latter. The affected wind farms can then change over to a voltage-impressing operating mode or can at least increase a proportion of voltage-impressing units by means of a changeover.

According to the invention, it was recognized, in particular, that electric supply networks can change. This may relate, for example, to the European integrated network which is mentioned here by way of example and is referred to as the integrated network for simplification and is also representative of other integrated networks. As a result of conventional power plants being substituted with converter-based renewable energy installations, the integrated system may lose voltage-impressing producers.

During undisrupted operation, the integrated network may be operated, under certain circumstances, with very few voltage-impressing units which are distributed as uniformly as possible or with no voltage-impressing units at all.

However, it has been recognized that, during disrupted operation, during network recovery operation or in the event of a black start, a voltage-impressing behavior may be necessary, and at least may be useful, under certain circumstances.

In order to achieve this, it is proposed that the installations, that is to say wind turbines or wind farms in particular, operate either in a current-impressing or voltage-impressing manner depending on properties of the network and/or an operating point of the installations and dynamically change over the properties.

An achievable advantage of this solution would be the avoidance of instabilities caused by a swarm of too many voltage-impressing systems while simultaneously covering the minimum requirement for voltage-impressing systems in the network.

The invention claimed is:

1. A method for supplying electric power to an electric supply network at a network connection point by a converter-controlled supply apparatus, comprising:
   permitting a selection between at least a current-impressing operating mode and a voltage-impressing operating mode for supplying the electric power;
   performing open-loop or closed-loop control to a desired current value in the current-impressing operating mode;
   performing the open-loop control or the closed-loop control to a desired voltage value in the voltage-impressing operating mode;
   changing an instantaneous operating mode between the current-impressing operating mode and the voltage-impressing operating mode in a plurality of steps or a seamless transition; and
   setting a mixed operating mode that combines a current-impressing property and a voltage-impressing property.

2. The method as claimed in claim 1, comprising:
   changing between the current-impressing operating mode and the voltage-impressing operating mode based on at least one criterion from a list including:
   a measure of a voltage fluctuation in the electric supply network;
   a current limitation measure of a number of times voltage-impressing units of the converter-controlled supply apparatus reach a current limitation;
   a ratio of directly coupled synchronous generators supplying the electric supply network to converter-controlled supply apparatuses supplying the electric supply network, wherein a respective currently supplied power, a respective active power, or a ratio of the respective currently supplied power and the respective active power is used as a reference variable;
   a measure of a frequency fluctuation in the electric supply network;
   a measure of phase jumps in the electric supply network;
   a network property of the electric supply network;
   an operating state of the converter-controlled supply apparatus that is at least one of the currently supplied power or the active power, with respect to a nominal power of the converter-controlled supply apparatus;
   a proportion of voltage-impressing supply apparatuses supplying the electric supply network;
   a proportion of wind turbines supplying the electric supply network;
   a proportion of solar generators supplying the electric supply network;
   a short-circuit power at the network connection point;
   a network impedance at the network connection point;
   a short-circuit current ratio at the network connection point;

detection of a formation of a subnetwork or an isolated network; and
an external changeover signal or selection signal.

3. The method as claimed in claim 2, wherein a changeover open-loop controller is used for the changing between the current-impressing operating mode and the voltage-impressing operating mode, wherein the changeover open-loop controller has an associated changeover criterion and changes between the current-impressing operating mode and the voltage-impressing operating mode based on the at least one criterion, and wherein the changeover open-loop controller implements an adaptation algorithm which uses the at least one criterion and qualitatively or quantitatively assesses the change between the current-impressing operating mode and the voltage-impressing operating mode using a quality measure.

4. The method as claimed in claim 2, wherein the network property is a network sensitivity.

5. The method as claimed in claim 2, wherein the external changeover signal is predefined by an operator of the electric supply network.

6. The method as claimed in claim 1, comprising:
selecting a frequency-impressing mode in which the converter-controlled supply apparatus performs the open-loop control or closed-loop control to a desired frequency value.

7. The method as claimed in claim 6, comprising:
changing between the frequency-impressing mode and an open-frequency operating mode, wherein the converter-controlled supply apparatus performs the closed-loop control to a frequency captured in the electric supply network in the open-frequency operating mode.

8. The method as claimed in claim 1, comprising:
outputting, by the converter-controlled supply apparatus, a voltage signal at a voltage output, wherein the voltage output is coupled to an inductor and an output current and an output voltage are produced at an output of the inductor based on the voltage signal, a voltage in the electric supply network and an inductance of the inductor;
performing closed-loop current control in the current-impressing operating mode and feeding back the output current as an actual value; or
performing closed-loop voltage control in the voltage-impressing operating mode and feeding back the output voltage as the actual value.

9. The method as claimed in claim 8, comprising:
permitting or performing the selection between the voltage-impressing operating mode and the current-impressing operating mode by a computer-implemented open-loop controller;
continuously determining the output current and the output voltage;
selecting, by the computer-implemented open-loop controller, between the output current and the output voltage as the actual value; or
generating, by at least one converter of the converter-controlled supply apparatus, the voltage signal as a pulsed voltage signal using a pulse pattern, and wherein the pulse pattern is generated based on the selected operating mode and the actual value fed back.

10. The method as claimed in claim 1, wherein a current band is predefined as the desired current value or a voltage band is predefined as the desired voltage value.

11. The method as claimed in claim 1, wherein the converter-controlled supply apparatus is a wind farm or a wind turbine.

12. A supply apparatus for supplying electric power to an electric supply network at a network connection point, comprising:
at least one converter or inverter configured to supply the electric power to the electric supply network resulting in operating the supply apparatus in a converter-controlled manner; and
at least one changeover open-loop controller for changing between a current-impressing operating mode and a voltage-impressing operating mode, wherein
open-loop or closed-loop control is performed to a desired current value in the current-impressing operating mode,
the open-loop control or the closed-loop control is performed to a desired voltage value in the voltage-impressing operating mode, and
a mixed operating mode that combines a current-impressing property and a voltage-impressing property is set.

13. The supply apparatus as claimed in claim 12, wherein the supply apparatus is a wind farm or a wind turbine.

14. The supply apparatus as claimed in claim 12, wherein the at least one changeover open-loop controller is configured to change between the current-impressing operating mode and the voltage-impressing operating mode based on at least one criterion.

15. The supply apparatus as claimed in claim 14, wherein the at least one changeover open-loop controller is configured to implement an adaptation algorithm which uses the at least one criterion and qualitatively or quantitatively assesses the change between the operating modes using a quality measure.

16. The supply apparatus as claimed in claim 14, wherein the at least one criterion is from a list including:
a measure of a voltage fluctuation in the electric supply network;
a current limitation measure of a number of times voltage-impressing units of the supply apparatus reach a current limitation;
a ratio of directly coupled synchronous generators supplying the electric supply network to supply apparatuses supplying the electric supply network, wherein a respective currently supplied power, a respective active power, or a ratio of the respective currently supplied power and the respective active power is used as a reference variable;
a measure of a frequency fluctuation in the electric supply network;
a measure of phase jumps in the electric supply network;
a network property of the electric supply network;
an operating state of the supply apparatus that is at least one of the currently supplied power or the active power, with respect to a nominal power of the supply apparatus;
a proportion of voltage-impressing supply apparatuses supplying the electric supply network;
a proportion of wind turbines supplying the electric supply network;
a proportion of solar generators supplying the electric supply network;
a short-circuit power at the network connection point;
a network impedance at the network connection point;
a short-circuit current ratio at the network connection point;
detection of a formation of a subnetwork or an isolated network; and
an external changeover signal or selection signal.

17. The supply apparatus as claimed in claim 12, wherein the supply apparatus is configured to output a voltage signal at a voltage output, wherein the voltage output is coupled to an inductor and an output current and an output voltage are produced at an output of the inductor based on the voltage signal, a voltage in the electric supply network and an inductance of the inductor, wherein closed-loop current control is performed in the current-impressing operating mode and the output current is fed back as an actual value or closed-loop voltage control is performed in the voltage-impressing operating mode and the output voltage is fed back as the actual value.

18. The supply apparatus as claimed in claim 17, wherein the at least one changeover open-loop controller is a computer-implemented open-loop controller and is configured to:
   continuously determine the output current and the output voltage; and
   select between the output current and the output voltage as the actual value.

19. The supply apparatus as claimed in claim 17, wherein the at least one converter is configured to generate the voltage signal as a pulsed voltage signal using a pulse pattern, and wherein the pulse pattern is generated based on the selected operating mode and the actual value fed back.

20. The supply apparatus as claimed in claim 12, wherein a current band is predefined as the desired current value or a voltage band is predefined as the desired voltage value.

\* \* \* \* \*